(12) United States Patent
Rhodes et al.

(10) Patent No.: US 8,375,719 B2
(45) Date of Patent: Feb. 19, 2013

(54) GLAND LEAKAGE SEAL SYSTEM

(75) Inventors: Lawrence Rhodes, Livermore, CA (US); Yakov Lerner, Foster City, CA (US)

(73) Assignee: Recurrent Engineering, LLC, Draper, UT (US)

( * ) Notice: Subject to any disclaimer, the term of this patent is extended or adjusted under 35 U.S.C. 154(b) by 1746 days.

(21) Appl. No.: 11/382,606

(22) Filed: May 10, 2006

(65) Prior Publication Data

US 2006/0277911 A1    Dec. 14, 2006

Related U.S. Application Data

(60) Provisional application No. 60/680,870, filed on May 12, 2005.

(51) Int. Cl.
*F01K 13/02*    (2006.01)
(52) U.S. Cl. ............... 60/646; 60/649; 60/651; 60/671; 60/657
(58) Field of Classification Search .................... 60/649, 60/651, 671, 646, 657
See application file for complete search history.

(56) References Cited

U.S. PATENT DOCUMENTS

| 4,604,867 | A |   | 8/1986 | Kalina |
| 4,838,027 | A |   | 6/1989 | Rosado |
| 5,913,812 | A |   | 6/1999 | Smith |
| 5,924,307 | A | * | 7/1999 | Nenov ............................ 62/643 |
| 6,213,059 | B1 | * | 4/2001 | Gralton et al. ................ 122/1 B |
| 6,820,421 | B2 | * | 11/2004 | Kalina ............................ 60/649 |

* cited by examiner

*Primary Examiner* — Hoang Nguyen
(74) *Attorney, Agent, or Firm* — Workman Nydegger

(57) ABSTRACT

The present invention is directed to a turbine seal system. The turbine seal system captures working fluid which is escaping from a closed loop thermodynamic cycle system, condenses the captured working fluid, and returns the condensate back to the thermodynamic cycle system. The turbine seal system is configured to apply nitrogen, or other non-condensable, or other material, to capture or mix with the escaping working fluid. The combined mixture of working fluid which escapes the turbine and the nitrogen utilized to capture the working fluid is evacuated by an exhaust compressor which maintains a desired vacuum in a gland seal compartment of the turbine seal. The combined mixture can then be sent to a condenser to condense the working fluid vapor and evacuate the non-condensables, forming a working stream. Once the non-condensables have been evacuated, the working stream is pumped to a higher pressure, and prepared to be re-introduced into the thermodynamic cycle system.

24 Claims, 3 Drawing Sheets

GLAND LEAKAGE SEAL SYSTEM

CROSS-REFERENCE TO RELATED APPLICATIONS

This application claims benefits from U.S. Provisional Patent Application Ser. No. 60/680,870 filed on May 12, 2005 entitled, GLAND LEAKAGE VACUUM SYSTEM, the contents of which are hereby incorporated by reference.

BACKGROUND OF THE INVENTION

1. The Field of the Invention

The present invention relates to a seal system for use in a closed loop thermodynamic system. In more particular, the present invention relates to a seal system for capturing working fluid that has leaked or escaped from an expansion turbine and returning the escaped working fluid to a mixed working fluid thermodynamic cycle, such as a Kalina Cycle.

2. The Relevant Technology

Thermal energy can be usefully converted into mechanical and then electrical form. Methods of converting the thermal energy of low and high temperature heat sources into electric power represent an important area of energy generation. There is a need for increasing the efficiency of the conversion of such low temperature heat to electric power.

Thermal energy from a heat source can be transformed into mechanical and then electrical form using a working fluid that is expanded and regenerated in a closed system operating on a thermodynamic cycle. The working fluid can include components of different boiling temperatures, and the composition of the working fluid can be modified at different places within the system to improve the efficiency of energy conversion operation.

Typically multi-component working fluids include a low boiling point component and a higher boiling point component. By utilizing the combination of the low boiling point component and a higher boiling point component, an external heat source stream, such as industrial waste heat, can be more efficiently utilized for electricity production. Examples of a low boiling point component include water.

Once the working fluid has been heated, it is expanded at a turbine to convert the potential energy to mechanical energy which is utilized in the generation of electricity. One difficulty experienced at typical turbines is that working fluid can leak and escape to the ambient. This problem is exacerbated when one or more components of the working fluid are in a vapor or super heated vapor form. Leakage of working fluid can reduce the total volume of working fluid being utilized in a cycle. This can create additional complications where the working fluid is being utilized in a closed loop. Additionally, at times one component of a multi-component working fluid can leak in disproportionate amounts relative to the other components. As a result, the species balance of the multi-component working fluid can be interrupted. Where ammonia is utilized as one of the components of the working fluid, the release of ammonia to the atmosphere can be undesirable due to the material properties of ammonia. As a result, controlling release of either component can be highly desirable.

Turbine seal systems have been created to moderate fluid leakage problems. However, such seal systems typically require modification or wholesale changes to the turbine system to be effective. As a result, specialized turbines must be created based on the particular requirements of the heat source stream being utilized. This can render the turbines prohibitively expensive and/or interfere with desired operation of the turbine engineering. Additionally, some systems require vacuum or other pressures in the systems to be maintained at particular parameters. As a result of the overall system requirements can become more expensive than desired.

BRIEF SUMMARY OF THE INVENTION

The present invention is directed to a gland leakage or turbine seal system. The turbine seal system is configured to capture working fluid which is escaping from a thermodynamic system having a multi-component working fluid, such as a Kalina Cycle system, condense the captured working fluid, and return the condensate back to the multi-component working fluid thermodynamic system. The turbine seal system is configured to apply nitrogen or other non-condensable gas, or other material, to capture or mix with the escaping working fluid. The combined mixture of the escaped working fluid and the nitrogen utilized to capture the working fluid is evacuated by an exhaust or compressor which maintains a desired vacuum in a turbine gland compartment. The combined mixture can then be sent to a condenser to condense the working fluid vapor and evacuate the non-condensables. Once the non-condensables have been evacuated, the working stream is pumped to a higher pressure, and prepared to be introduced back into the thermodynamic system.

According to one embodiment of the present invention, once the combined mixture has been condensed and the resulting working stream pumped to a higher pressure, the working stream is preheated and partially boiled. The working stream is then separated by a separator, wherein the vapor of the working stream (i.e. rich stream) is returned to the thermodynamic system and the liquid portion (i.e. lean stream) of the working stream is combined with the combined mixture.

According to another embodiment of the present invention, a mechanical compressor is utilized to pressurize the combined mixture to a level that it can be fully condensed and distilled at given coolant temperatures. Utilizing a compressor enables condensation of the combined mixture at available coolant temperatures. Additionally, this allows the system to maintain the desired seal vacuum even under extraordinarily hot ambient conditions. Optionally, a heat exchanger can be utilized to manipulate the parameters of the combined mixture to approximate the combined mixture's dew point in order to decrease the mechanical power required for pre-condensation compression.

The mechanical compressor allows for desired system operation under a wide variety of ambient temperature conditions. According to one embodiment, the mechanical compressor may be required only a portion of the time and may otherwise be bypassed. Optionally, the compressor may be utilized even when not required for condensation to pressurize the condenser above ambient pressure such that non-condensables may be vented without an additional blower.

According to another embodiment of the present invention, a two-stage, heat-operated distillation system is utilized. By utilizing a two-stage, heat-operated distillation system, pressurized vapor, which has already been through the condenser and which has a temperature higher than the dew point curve, can be distilled to produce a sufficient liquidity for dilution. In the illustrated embodiment, once the working stream has been pumped to a higher pressure, it is preheated and partially boiled and sent to a first separator. At the first separator, the working stream having a temperature that is higher than the dew point (i.e. rich stream) can be sent to a vapor cooler. At the vapor cooler, the parameters of the rich stream can be changed to approximate the rich stream's dew point, and then the rich stream can be separated at a second dew point separator. At the dew point separator, rich stream can be returned to the multi-component thermodynamic system having substantially the same parameters as the expanded working fluid exiting the turbines in the thermodynamic system.

After the combined mixture has been condensed, the flow of the working stream through the pump can be adjusted to maintain desired system operation. For example, the flow of working stream can be utilized to adjust the vacuum in the turbine seal and the overall flow of fluid through the turbine seal system. Additionally, flow of a heat source stream through the heat exchangers can be throttled to further alter the turbine seal system parameters.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
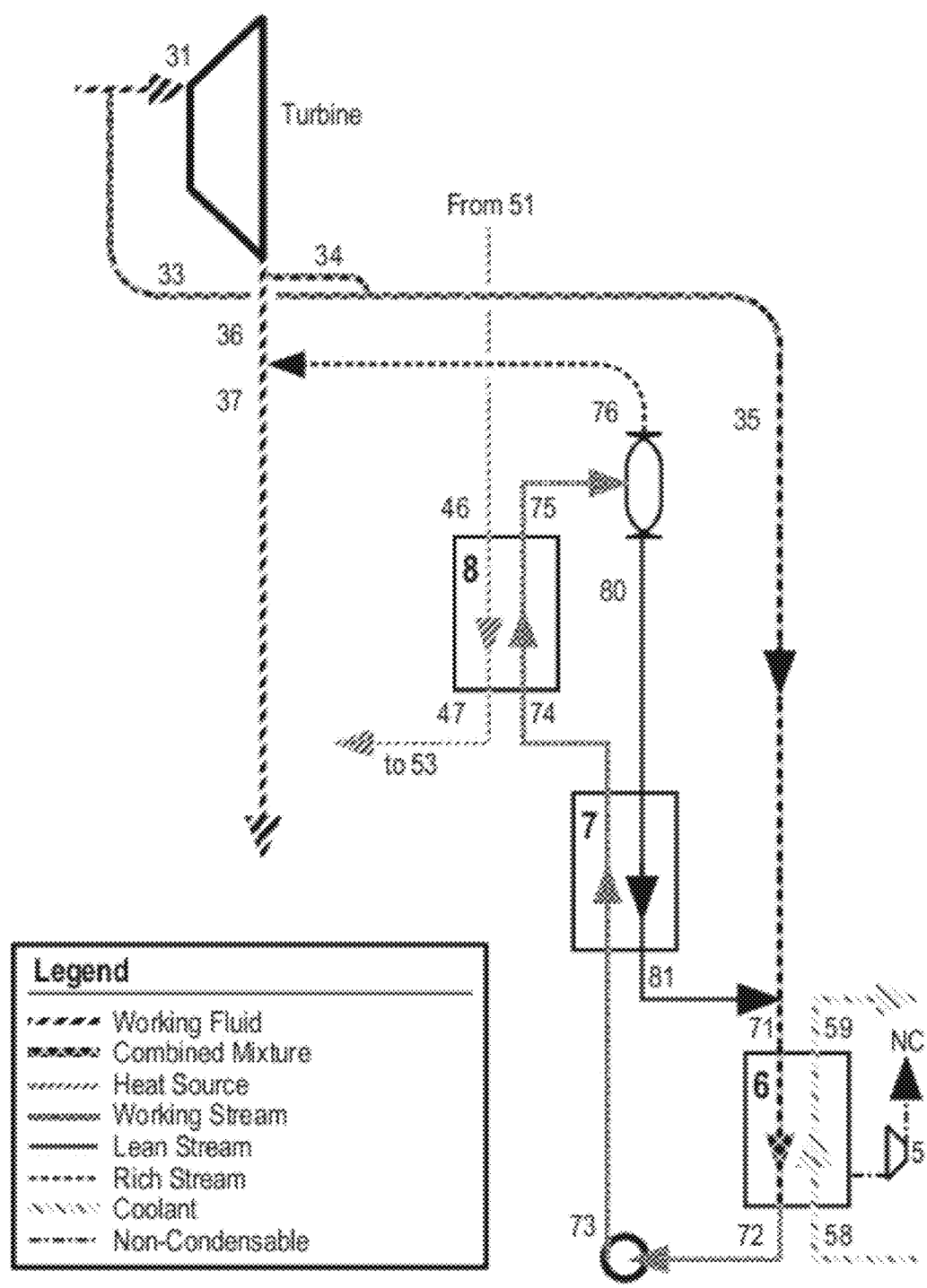
FIG. 1 illustrates a turbine seal system, which is utilized in a multi-component working fluid thermodynamic system, according to one embodiment of the present invention.

The present invention is directed to a gland leakage or turbine seal system. The turbine seal system is configured to: (i) capture working fluid which has escaped from a multi-component working fluid thermodynamic system, such as a Kalina Cycle; (ii) condense the captured working fluid; and (iii) return the condensate back to the thermodynamic system. The turbine seal system is configured to utilize nitrogen or other non-condensable gas, or other material or combination thereof, to capture the escaping working fluid. The combined mixture of working fluid which escapes the turbine and the nitrogen utilized to capture the working fluid is evacuated by an exhaust or compressor which maintains a desired vacuum in the turbine gland seal. The combined mixture can then be sent to a condenser to condense the combined mixture and evacuate the non-condensables. Once the non-condensables have been evacuated, the working stream is pumped to a higher pressure, and prepared to be introduced back into the thermodynamic system.

According to one embodiment of the present invention, once the combined mixture has been condensed and the working stream pumped to a higher pressure, the working stream is preheated and partially boiled. The working stream is then separated by a separator, wherein the vapor of the working stream (i.e. rich stream) is returned to the thermodynamic system and the liquid portion (i.e. lean stream) of the working stream is combined with the combined mixture.

According to another embodiment of the present invention, a mechanical compressor is utilized to enable condensation of the combined mixture at given coolant temperatures. Additionally, the compressor enables the system to maintain a desired seal vacuum even under extraordinarily hot ambient conditions. Optionally, a heat exchanger can be utilized to manipulate the parameters of the combined mixture to approximate the combined mixture's dew point in order to decrease the mechanical power required for pre-condensation compression. The mechanical compressor allows for desired system operation under a wide variety of ambient temperature conditions. According to one embodiment, the mechanical compressor may be required only a portion of the time and may otherwise be bypassed. Optionally, the compressor may be utilized even when not required for condensation to pressurize the condenser above ambient pressure such that non-condensables may be vented without an additional blower.

According to another embodiment of the present invention, a two-stage, heat-operated distillation system is utilized. By utilizing a two-stage, heat-operated distillation system, pressurized vapor, which has already been through the condenser and which has a temperature higher than the dew point curve, can be distilled to produce a sufficient liquidity for dilution. In the illustrated embodiment, once the working stream has been pumped to a higher pressure, it is preheated and partially boiled and sent to a first separator. At the first separator, the working stream having a temperature that is higher than the dew point (i.e. rich stream) can be sent to a vapor cooler. At the vapor cooler, the parameters of the rich stream can be changed to approximate the rich stream's dew point, and then the rich stream can be separated at a second dew point separator. At the dew point separator, rich stream can be returned to the multi-component thermodynamic system having substantially the same parameters as the expanded working fluid exiting the turbines in the thermodynamic system.

After the combined mixture has been condensed, the flow of the working stream through the pump can be adjusted to maintain desired system operation. For example, the flow of working stream can be utilized to adjust the vacuum in the turbine seal and the overall flow of fluid through the turbine seal system. Additionally, flow of a heat source stream through the heat exchangers can be throttled to further alter the turbine seal system parameters.

FIG. 1 illustrates a turbine seal system according to one embodiment of the present invention. In this embodiment, the turbine seal system is utilized in connection with an expansion turbine 31-36 of a thermodynamic cycle system. The present invention may be utilized in connection with a closed-loop thermodynamic system which utilizes a multi-component working fluid, such as a Kalina Cycle system. While it is understood that the invention may be incorporated into a variety of different types of thermodynamic cycle systems, reference will be made herein specifically to a Kalina Cycle system. Expansion system 31-36 is utilized to expand the high energy working fluid of the thermodynamic system. Expansion of high energy working fluid enables the potential energy of the working fluid to be converted into electrical energy. Exemplary Kalina Cycle technologies are illustrated in U.S. Pat. Nos. 5,953,918; 5,5,572,871; 5,440,882 and 4,982,568.

The turbine seal system seals both shaft ends of the expansion turbine 31-36 with nitrogen at points 31 and 34, utilizing labyrinth or mechanical dry gas seals. The labyrinth or mechanical dry gas seals function to reduce the amount working fluid that escapes from the expansion turbine. By sealing both ends of the turbine with nitrogen, any working fluid which would otherwise escape to the ambient environment is captured and combined with the nitrogen. The escaped working fluid having the parameters at point 33 and 34 is thus captured and can be returned to the thermodynamic cycle system. This combined mixture of nitrogen and working fluid will hereinafter be referred to as the combined mixture. The combined mixtures at points 33 and 34 are combined at a point shortly downstream from point 34 and having the parameters at point 35.

The combined mixture at point 35 is evacuated toward a condenser 6. Shortly before entering condenser 6, the combined mixture is combined with a lean stream from point 81 to form the combined mixture at 71. Combined mixture 71 enters condenser 6 having the parameters at point 71. In the condenser, the combined mixture is provided with an initial degree of condensation intended to bring the working fluid to the bubble point.

The combined mixture is condensed utilizing a coolant 58, 59. Coolant 58, 59 enters heat exchanger 6 having a low temperature parameter at point 58 and a higher temperature parameter at point 59. The transition of the coolant from the low temperature parameter 58 to the higher temperature parameter 59 occurs as a result of the heat exchange relationship with the combined mixture 71, 72 in heat exchanger 6. Condenser 6 is utilized to condense the condensable working fluid of the combined mixture such that the working fluid has the parameters of point 72.

In connection with condenser 6, non-condensables such as nitrogen from the combined mixture 71, 72, which are initially provided at both sides of the turbine at point 33 and 34, are evacuated to a blowdown tank 5. Blowdown tank 5 is utilized to prevent the inadvertent release of any remaining working fluid into ambient, while allowing for evacuation of the non-condensables, such as nitrogen. The use of nitrogen to capture working fluid can allow for both the desired capture of escaping working fluid while also providing an environmentally-friendly non-condensable which can be exhausted to the environment in a safe and effective manner.

At point 72, the condensed working fluid comprises a working stream having parameters at point 72. Working stream 72 is sent to a compressor 73. At compressor 72, 73, the working stream 73 is compressed and sent to a heat exchanger 7. In heat exchanger 7, the working stream is preheated utilizing a lean stream 80, 81. The preheated working stream is then sent to a heat exchanger 8. Heat exchanger 8 utilizes a temperature source fluid 51 from an external heat source stream. According to one embodiment of the present invention, the temperature source fluid comprises fluid from the Kalina Cycle. According to another embodiment, the temperature source fluid is from a fluid source external to the Kalina Cycle and the turbine seal system. The temperature source fluid can comprise a variety of heat sources such as geothermal brine, industrial waste heat, or the like.

In heat exchanger 8, the preheated working stream is heated from a temperature parameter 74 to a temperature parameter 75. According to one embodiment of the present invention, the working stream is partially boiled utilizing heat exchanger 8. From point 75, the partially boiled working stream enters a dew point separator 76-80. Dew point separator 76-80 separates the working stream into a rich stream 76 and a lean stream 80. Rich stream 76 may have substantially the same pressure and composition as the working fluid or spent stream exiting the expansion turbine at point 36. In this manner, introduction of the rich stream 76 may not substantially change the balance of the components of the working fluid of the Kalina Cycle. Additionally, the pressure and other parameters, such as composition, of the working fluid from point 36 to point 37 in the Kalina Cycle can be maintained.

While the working stream exiting dew point separator at point 76 is described as a rich stream, it has substantially the same parameters as the working fluid or spent stream at point 36. However, with respect to the working stream at point 80 (i.e. rich stream), working stream at point 76 (i.e. lean stream) has substantially more of the low boiling point component of the working stream than the working stream at point 80. According to one embodiment of the present invention, dew point separator 76-80 separates the vapor portion of the working stream from the liquid portion of the working stream. The vaporized working stream is separated to point 76, where it has substantially the same vaporized characteristics as the working fluid or spent stream at point 36. The liquid portion or the lean stream 80 does not have the same temperature parameters as the working fluid at point 36.

The lean stream 80 is sent to heat exchanger 7, where it is utilized to preheat the compressed working stream 73, 74. The heat exchange relationship between compressed working stream 73-74 and lean stream 80-81 reduces the temperature of the lean stream to point 81. The cooled lean stream is then combined with the combined mixture 35 to provide the combined mixture having the temperature parameters at point 71. The introduction of the lean stream 81 to combined mixture 35 can transfer energy from combined mixture 35 to the components of lean stream 81. In this manner, the energy parameters of the combined mixture at point 71 are less than the combined mixture at point 35, thus facilitating condensation of combined mixture 71 in condenser 6.

The turbine seal system is utilized to both capture vaporized working fluid that is escaping from turbine 31-36 while also returning such working fluid to the Kalina Cycle. The working fluid is returned to the Kalina Cycle having substantially the same pressure as the working fluid with which it is being combined within the Kalina Cycle. Utilizing a gland leakage compressor system minimizes the escape of the low boiling point component of the working fluid into the environment. The capture of the low boiling point component can be particularly helpful where the chemical properties of the component are harmful to the environment. Additionally, by preventing the loss of working fluid, efficiency and conservation of working fluid and, in particular, the low boiling point component of the working fluid, is maintained.

According to one embodiment of the present invention, compressor 72-73 can be controlled to regulate the amount of flow of the condensed working stream through compressor 72-73. In this manner, the desired vacuum pressure in the turbine seal system can be maintained. Controlling the pressure in the turbine seal system enables a user to control the parameters of the partially boiled working stream at point 75 to follow a desired dew point curve.

The dew point curve is based on a function of pressure and composition of the working stream and other parameters of the system. In the event that the temperature of the working stream needs to be increased, the heating fluid 46-47 can be throttled to increase the temperature parameters provided in heat exchanger 8. In this manner, other changes in parameters within the system can be overcome to maintain the desired dew point temperature of the partially boiled working stream at point 75.

By maintaining the dew point temperature of the working stream, the working stream is prepared for introduction of the partially boiled working stream into the dew point separator 76-80. In other words, flow of a heating fluid 46-47 and flow of working stream through compressor 72-73 can be utilized to maintain desired parameters within the system and to allow for proper functionality of the turbine seal system. In particular, the parameters of the working stream at point 76 can be maintained to approximate the parameters of working fluid or spent stream at point 36. Additionally, a desired degree of vacuum can be maintained within the turbine seal system to draw the combined mixture through the condenser and the working stream into the compressor 72-73.

According to one embodiment of the present invention, a desired vacuum of approximately 30-50 mbar is maintained within the turbine gland compartment. This allows for evacuation of a combined mixture from points 33 and 34 and into condenser 6. Once the combined mixture has been condensed, the working stream can be compressed by compressors 72-73, preheated in heat exchanger 7, partially boiled in heat exchanger 8, separated by a dew point separator 76-80, and returned to the Kalina Cycle system at point 36-37 to provide a working stream having the parameters as at point 37.

As will be appreciated by those skilled in the art, a variety of types and configurations of compressors can be utilized without departing from the scope and spirit of the present invention. According to one embodiment of the present invention, the turbine seal system of FIG. 1 is utilized when the seal system is air cooled in an ambient air temperature of approximately 75 degrees Fahrenheit. According to another embodiment of the present invention, the turbine seal system of FIG. 1 is utilized for water cooled plants where the cooling water temperature is approximately 85 to 87 degrees Fahrenheit. According to another embodiment of the present invention, the coolant 58-59 utilizes a medium having approximately a temperature parameter of no more than 65 degrees Fahrenheit. In other words, the turbine seal system of FIG. 1 can be utilized where the operating parameters of the system are sufficient to maintain desired system operability without additional components or systems.

According to another embodiment of the present invention, the turbine seal system can be utilized in conventional turbine gland seals without any sophisticated or complicated modifications to the existing turbine gland seals. According to another embodiment of the present invention, the turbine seal system is utilized with turbine gland seals which are modified in particular for use with the turbine seal system.

Figure 2:
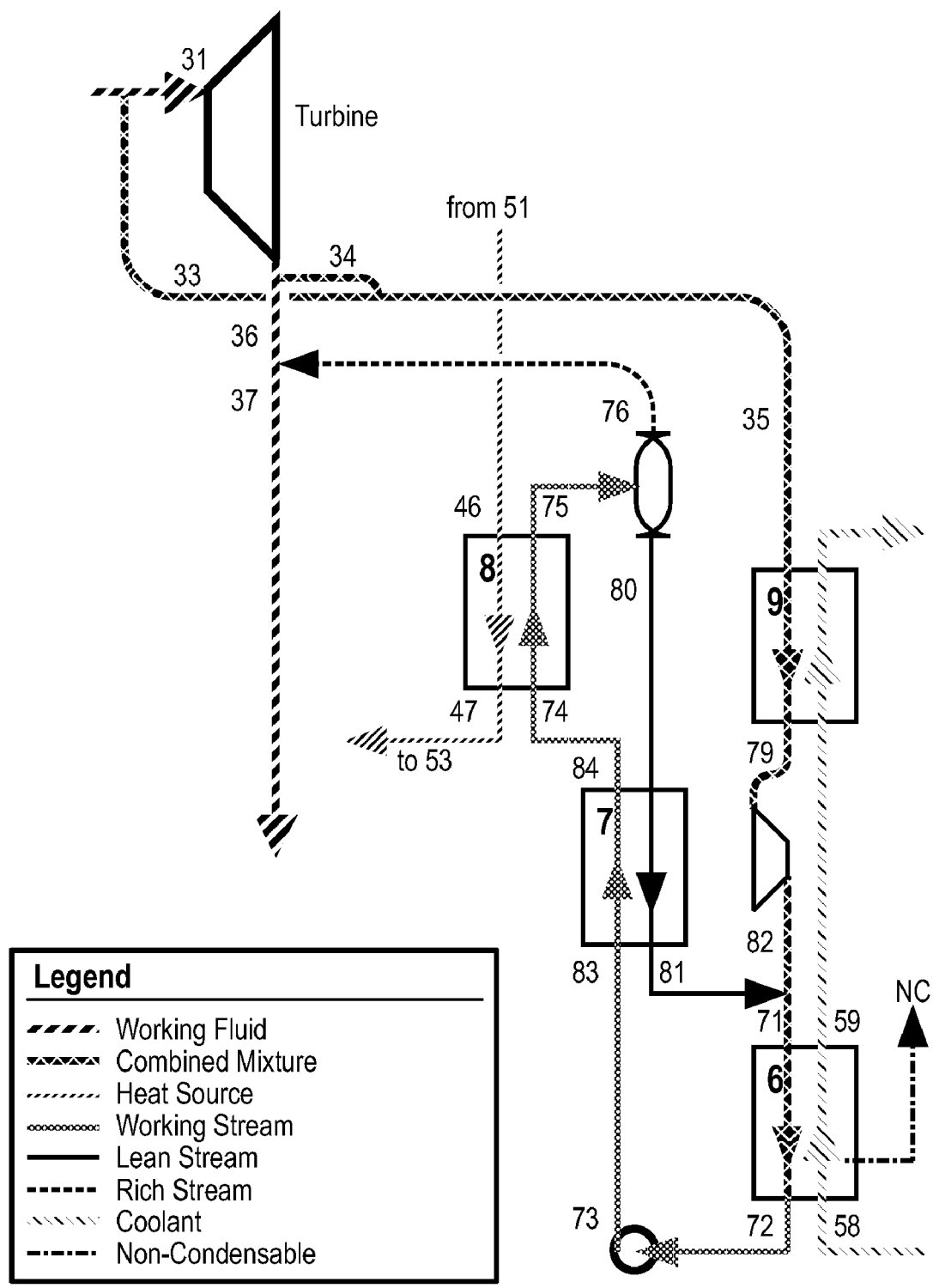
FIG. 2 illustrates a turbine seal system having a mechanical compressor, according to one embodiment of the present invention.

FIG. 2 is a schematic view of a turbine seal system, according to another embodiment of the present invention. In the illustrated embodiment, the turbine seal system includes a heat exchanger 9 and a compressor 79-82. In the illustrated embodiment, combined mixtures at point 35 are sent to a cooler 9. Cooler 9 comprises a heat exchanger which reduces the temperature parameters of the combined mixture at point 35 to a temperature parameter at point 79. The temperature parameter at point 79 is less than the temperature parameter at point 35, decreasing the mechanical power acquired by compressor 79-82. In the illustrated embodiment, a coolant exiting condenser 6 is utilized to cool the combined mixture in heat exchanger 9. However, as will be appreciated by one of ordinary skill in the art, the coolant utilized in connection with heat exchanger 9 may be separate and distinct from coolant in condenser 6.

From point 79, the combined mixture is compressed by a mechanical compressor 79-82. Mechanical compressor 79-82 compresses the combined mixture. Increased compression enables condenser 6 to condense the combined mixture from point 71 to point 72 utilizing the available coolant temperature of coolant 58-59. According to one embodiment of the present invention, mechanical compressor 79-82 compresses the combined mixture to a maximum compression of 4 to 1, when compared with the compression of the combined mixture at point 79. Compressing the combined mixture at a compression of 4 to 1 further facilitates the desired seal vacuum in the expansion turbine of the Kalina Cycle, even under extraordinarily hot ambient temperature conditions. Additionally, cooling the combined mixture from point 35 to point 39 decreases the mechanical power needed for compression utilizing mechanical compressor 79-82.

As will be appreciated by those skilled in the art, cooling of the combined mixture utilizing heat exchanger 9 and compression utilizing compressor 79-82 can optionally be bypassed when temperatures parameters within the system due not require additional cooling and/or compression of the combined mixture. For example, in some systems, normal operating parameters will not require cooling or compression of the combined mixture, as provided by heat exchanger 9 and compressor 79-82. However, occasional adjustments to the system, such as available coolant temperatures, the return pressure and the main separator 76-80, temperature parameter of the combined mixture, or other system variables can benefit from the additional operability provided by compressor 79-82 and/or heat exchanger 9. For example, according to one embodiment of the present invention, return pressure in the main separator 76-80 can increase to the point where the liquid composition becomes too rich in low boiling point component to condense at the available coolant temperature. As a result, the additional cooling of the combined mixture provided by heat exchanger 9 and/or the compression exerted or provided by mechanical compressor 79-82 allows heat exchanger 6 to condense the combined mixture at the available coolant temperature parameters of coolant 58-59.

According to another embodiment of the present invention, compressor 79-82 is utilized on an ongoing basis, even when the pressure within the system and/or the temperature parameters of the combined mixture is within acceptable ranges. Utilizing the compressor 79-82 when the operating conditions within the system are within normal ranges allows for direct exhausting of the non-condensables, such as the nitrogen or other fluid utilized to capture the working fluid at the expansion turbine even without the use of blowdown tank as is illustrated in FIG. 1. By allowing for direct exhausting of the system, additional system components are minimized and/or eliminated to reduce overall system cost and complexity. As will be appreciated by those skilled in the art, the ability of the condenser 6 to condense the combined mixture at point 71-72 is based not only on the coolant temperature parameters of coolant 58-59, but also of the compression of the combined mixture at point 71.

Once the working stream has been pumped to a higher pressure parameter at point 73, the working stream enters heat exchanger 7 having parameters at point 83. The working stream is preheated to temperature parameters at point 84 and sent to heat exchanger 8. At heat exchanger 8, the working stream is partially boiled and sent to separator 76-80. In separator 76-80, the vapor component of the working stream (i.e. rich stream) is separated at point 76 and introduced into the Kalina Cycle system at point 36-37, and the liquid portion of the working stream 80 (i.e. lean stream) is recombined with combined mixture between compressor 79-82 and condenser 6.

By providing a working stream having substantially the same pressure and composition as the working fluid or spent stream exiting the expansion turbine at point 36, the overall composition and parameters of the working fluid within a Kalina Cycle is substantially unchanged. This allows the turbine seal system to be utilized without additional system modification or design changes within the Kalina Cycle, while at the same time providing the benefits of the turbine seal system.

As will be appreciated by those skilled in the art, a variety of types and configurations of system and system components can be utilized without departing from the scope and spirit of the present invention. For example, according to one embodiment of the present invention, a pre-condenser coolant heat exchanger is utilized in the absence of a mechanical compressor. In another embodiment, a mechanical compressor is utilized in the absence of a pre-condenser coolant heat exchanger. In yet another embodiment, one or both of the coolant compressor and the heat exchanger can be utilized. In another embodiment, a coolant compressor is positioned downstream from the mechanical compressor.

Figure 3:
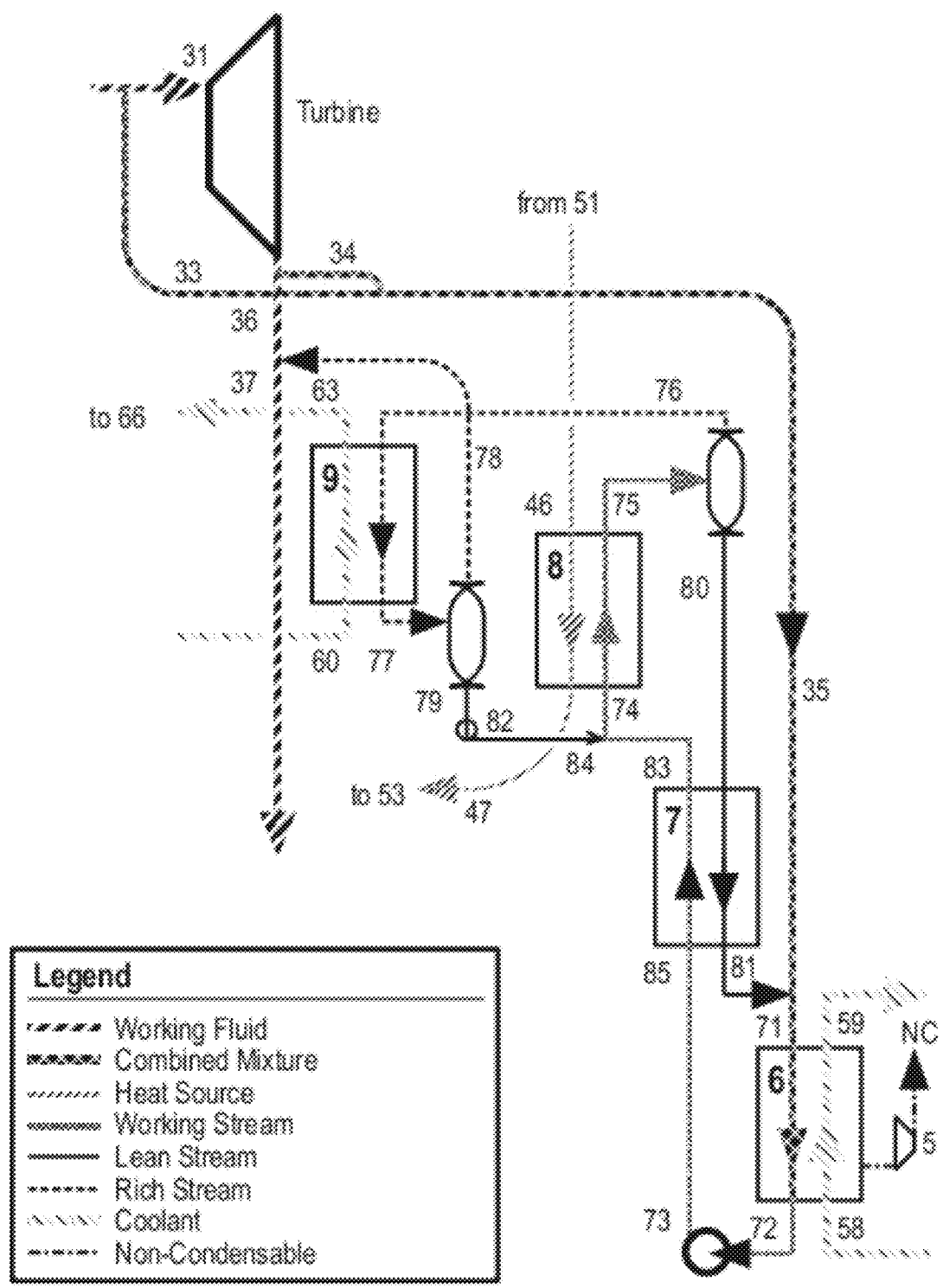
FIG. 3 illustrates a turbine seal system having a two-stage, heat-operated system, including a first separator and a second separator, according to another embodiment of the present invention.

FIG. 3 is a schematic view of a turbine seal system, according to another embodiment of the present invention. In the illustrated embodiment, the turbine seal system includes a first separator 76-80 and a second seal separator 79-82. Utilizing the first separator and a second separator provides a two-stage heat-operated system. This extends the operational range of temperature parameters of the combined mixture without utilizing mechanical compression like the embodiment in FIG. 2.

In the illustrated embodiment, compressor 72-73 is utilized to pump the condensed working stream to a higher pressure than the condensed working stream exiting condenser 6. In this embodiment, the temperature parameter of the working stream at point 85 exceeds a temperature parameter desired in a typical setting. As a result, subsequent to heating of the working stream in heat exchanger 7 and heat exchanger 8, the working stream at point 75 has a temperature parameter that is higher than the dew point curve.

As the working stream is separated in separator 76-80, the rich stream may have more of the high boiling point component than the working fluid or spent stream at point 36 in the Kalina Cycle. This is largely due to the fact that the working stream at point 75 typically exceeds the dew point. As a result, a larger portion of the rich stream comprises the low boiling point component than if the working fluid was at the dew point. Because the working stream at point 75 exceeds the dew point, substantially all of the liquid component of the working stream (i.e. lean stream) will comprise the high boiling point component. As a result, the separator liquid at point 80 comprises a lean stream, which can be utilized to dilute the combined mixture when mixed with the combined mixture 35 at point 71. Furthermore, in the illustrated embodiment, lean stream is utilized in heat exchanger 7 to increase the temperature parameter of working stream from that at point 85 to that at point 83.

Once the liquid working stream has been separated in separator 76-80, the rich stream 76 is sent to heat exchanger 9. Heat exchanger 9 comprises a cooler which decreases the temperature parameter of the rich stream from point 76 to point 77. In the illustrated embodiment, the coolant used in heat exchanger 9 comprises a working fluid from the Kalina Cycle. The working fluid from the Kalina Cycle cools the rich stream of the turbine seal system, while the rich stream from point 76 to point 77 heats the working fluid within the Kalina Cycle from point 60 to point 63. In this manner, not only does the working fluid from the Kalina Cycle assist in cooling of the rich stream within the turbine seal system, but the rich stream from with the turbine seal system also facilitates heating of the working fluid within the Kalina Cycle.

Once the temperature parameter of the rich stream has been cooled from point 76 to point 77, it is sent to a dew point separator 79-78. Optionally, the system can be configured such that the rich stream at point 77 approximates the dew point. When the rich stream is at the dew point, substantially more of the vapor within the rich stream includes the low boiling point component. In this manner, the composition and temperature parameters of the rich stream 78 substantially approximates the composition of the working fluid or spent stream exiting the turbine at point 36.

The introduction of the rich stream 78 at point 36 minimally effects the temperature composition of the resulting working fluid 37. In other words, the composition and temperature parameter of the working fluid at point 37 closely approximates the temperature and composition of the working fluid or spent stream at point 36. However, an increased flow will be provided at point 36 due to the addition of rich stream from point 78 at point 36-37.

Dew point separators 79-78 also separates rich stream 77 into a lean stream 79. Lean stream 79 includes substantially more of the high boiling point component than rich stream 78. Lean stream 79 can be pumped utilizing a compressor 79-82 to return the pressure parameter of lean stream 79 to a point 82. Additionally, the compression of the lean stream at point 82 approximates the pressurization parameter of the working stream at point 83. Lean stream 82 is combined with working stream 83 at point 84 to provide a working stream having parameters at point 74.

As previously discussed, working stream is sent to heat exchanger 8 to increase the temperature parameters to point 75. In the illustrated embodiment, an external heat source stream 46-47 is utilized in heat exchanger 8 to heat working stream 74-75. Due to the higher percentage of high boiling point component in lean stream 82, the resulting working stream at point 74 also has more of the high boiling point component than the working stream at point 83. As a result, once working stream 74 has been heated to temperature parameters at point 75 and separated in separator 80-76, substantially more of the low boiling point component is separated into lean stream 80, providing a sufficient lean stream for dilution at point 81.

The compression provided by compressor 72-73 induces a negative pressure in condenser 6 relative to point 73, which negative pressure draws the combined mixture into condenser 6. As a result, adjusting the flow through compressor 72-73 allows the compressor 72-73 to influence the temperature of the working stream at separator 76-80. Similarly, the temperature of the working stream 75-74 can be increased by throttling the heat source working stream 46-47 from heat source 51.

According to one embodiment of the present invention, the temperature of the working stream at point 75 should never fall below the dew point prior to being introduced into separator 80-76. This maintains desired species balance of the working stream in the turbine seal system in order to provide the desired composition and temperature parameters of the rich stream at point 78. In the event that the temperature parameter of the working stream begins to fall, the rate of flow of fluid through compressor 72-73 can be decreased and/or throttling of the heat source stream can be effectuated to provide a greater amount of heating of the working stream within the turbine seal system. For example, in unfavorable ambient temperature conditions, the size of the heat exchanger 74-75 and the amount of heat consumed therein can be quite large despite a small amount of flow at point 35.

As will be appreciated by those skilled in the art, a variety of types and configurations of turbine seal systems can be utilized without departing from the scope and spirit of the present invention. For example, according to one embodiment, a mechanical compressor depicted in FIG. 2 can be utilized in connection with the two-stage, heat-operated system of FIG. 3. According to another embodiment of the present invention, the cooler and/or the compressor depicted in FIG. 2 can be utilized with the two-stage, heat-operated system of FIG. 3. According to another embodiment, automatic regulation of one or more parameters within the system can be regulated utilizing a compressor and/or pump and a heat source stream flow to regulate operating parameters of the system. According to another embodiment of the present invention, one or more system components can be bypassed depending upon operating conditions, such as temperature parameters of the combined mixture within the system. Furthermore, the present invention may be incorporated into a variety of different types of closed loop thermodynamic cycle systems having multi-component working fluid.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for sealing a turbine of a thermodynamic cycle to minimize the escape of working fluid to the ambient environment, the method comprising:
   expanding at a turbine a multi-component gaseous working stream of a thermodynamic cycle system transforming its energy into a usable form and producing a spent stream, wherein at least a portion of the multi-component working stream escapes from the thermodynamic cycle system at the turbine;
   providing a non-condensable that mixes with the escaped multi-component working stream to form a combined stream;
   condensing, at least partially, the combined stream to separate the escaped multi-component working stream from the non-condensable; and
   returning the escaped multi-component working stream to the thermodynamic cycle system.

2. The method of claim 1, wherein the non-condensable comprises nitrogen.

3. The method of claim 1, wherein the thermodynamic cycle system comprises a Kalina Cycle system.

4. The method of claim 1, further comprising evacuating the combined stream to maintain a desired vacuum within a compartment of the turbine.

5. The method of claim 1, further comprising pumping the multi-component working stream, after condensing the multi-component working stream, to a higher pressure.

6. The method of claim 1, further comprising compressing the combined stream.

7. The method of claim 1, further comprising evacuating the non-condensable after condensing the combined stream.

8. A method for sealing a turbine within a thermodynamic cycle to minimize the escape of working fluid to the ambient environment, such that working fluid which escapes from the turbine is captured, condensed, and returned to the thermodynamic cycle the method comprising;
   expanding at a turbine a multi-component working stream of a thermodynamic cycle transforming its energy into a usable form and producing a spent stream;
   mixing a non-condensable with at least a portion of the multi-component working fluid escaping from the thermodynamic cycle at the turbine to form a combined stream;
   condensing at least a portion of the combined stream to separate the escaped multi-component working fluid from the non-condensable, the separated multi-component working fluid forming a working stream;
   pressurizing the working stream; and
   returning at least a portion of the pressurized working stream to the thermodynamic cycle.

9. The method of claim 8, wherein the non-condensable comprises nitrogen.

10. The method of claim 8, wherein the method of sealing a turbine is provided in connection with closed loop thermodynamic system in order to maintain species balance within the thermodynamic system.

11. The method of claim 8, further comprising cooling the combined stream in preparation for condensing at least a portion of the combined stream.

12. The method of claim 11, further comprising compressing the cooled combined stream to facilitate condensation of at least a portion of the combined stream.

13. The method of claim 8, further comprising separating the pressurized working stream into a lean stream and a rich stream.

14. The method of claim 13, further comprising combining the lean stream with the combined stream.

15. The method of claim 13, further comprising separating the rich stream into a second rich stream and a second lean stream, wherein the second rich stream is combined with the spent stream and the second lean stream is combined with the working stream.

16. A method for sealing a turbine within a thermodynamic cycle to minimize the escape of working fluid to the ambient environment, wherein at least a portion of the working fluid that escapes from the turbine is captured, and returned to the thermodynamic cycle, the method comprising:
   expanding a multi-component working fluid in the turbine of the thermodynamic cycle thereby transforming its energy into a usable form and producing a spent stream;
   forming a combined stream by mixing a non-condensable with multi-component working fluid escaping from the thermodynamic cycle at the turbine;
   condensing at least a portion of the combined stream in a condenser to separate the escaped multi-component working fluid from the non-condensable;
   forming a working stream from the combined stream by evacuating the non-condensable;
   pumping the working stream to a higher pressure than the pressure of the combined stream in the condenser;
   heating the working stream in a heat exchanger to increase the temperature of the working stream towards the dew point;
   splitting the working stream forming a lean stream to be added to the combined stream and a rich stream having temperature and pressure parameters approximating the spent stream; and
   returning the rich stream to the thermodynamic cycle.

17. The method of claim 16, wherein the rich stream is combined with the spent stream of the thermodynamic cycle.

18. The method of claim 16, wherein splitting of the working stream occurs in a first separator.

19. The method of claim 18, further comprising splitting the rich stream in a second separator.

20. The method of claim 19, wherein the working stream introduced into the first separator exceeds the dew point.

21. The method of claim 20, wherein the rich stream introduced into the second separator approximates the dew point.

22. The method of claim 19, further comprising splitting at the second separator the rich stream into a second rich stream to be returned to the thermodynamic cycle and a second lean stream which is combined with the combined stream.

23. The method of claim 16, wherein the working stream is heated by the lean stream.

24. The method of claim 16, wherein the working stream is heated by an external heat source.

* * * * *